(12) United States Patent
Fujie

(10) Patent No.: US 12,450,149 B2
(45) Date of Patent: Oct. 21, 2025

(54) LADDER PROGRAM ANALYSIS DEVICE USED IN A PROGRAMMABLE LOGIC CONTROLLER (PLC)

(71) Applicant: FANUC CORPORATION, Yamanashi (JP)

(72) Inventor: Shougo Fujie, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 207 days.

(21) Appl. No.: 18/255,348

(22) PCT Filed: Dec. 16, 2021

(86) PCT No.: PCT/JP2021/046507
§ 371 (c)(1),
(2) Date: May 31, 2023

(87) PCT Pub. No.: WO2022/138442
PCT Pub. Date: Jun. 30, 2022

(65) Prior Publication Data
US 2024/0028333 A1    Jan. 25, 2024

(30) Foreign Application Priority Data

Dec. 21, 2020 (JP) .................................. 2020-211354

(51) Int. Cl.
*G06F 11/3668* (2025.01)
*G05B 19/05* (2006.01)
*G06F 11/36* (2025.01)

(52) U.S. Cl.
CPC .......... *G06F 11/3676* (2013.01); *G05B 19/05* (2013.01); *G06F 11/36* (2013.01)

(58) Field of Classification Search
None
See application file for complete search history.

(56) References Cited

U.S. PATENT DOCUMENTS 5,781,776 A * 7/1998 Johnston ................. G06F 8/656
                                                    717/130
2015/0338973 A1* 11/2015 Inamoto ................ G06F 1/1694
                                                    345/659

(Continued)

FOREIGN PATENT DOCUMENTS

JP      S60-005347 A      1/1985
JP      H10-283005 A      10/1998

(Continued)

OTHER PUBLICATIONS

International Search Report issued in PCT/JP2021/046507; mailed Mar. 8, 2022.

*Primary Examiner* — Qing Chen
(74) *Attorney, Agent, or Firm* — Studebaker Brackett PLLC

(57) ABSTRACT

The purpose of the present invention is to easily measure the execution path of a ladder program without manual work by an operator.
The present Invention provides an analysis device provided with: a path analysis unit for analyzing each path of a ladder program circuit; a contact point combination acquisition unit for acquiring combinations of contact points for analyzed paths, and a path output unit for outputting a path on the basis of a calculation result of a condition value for each combination.

11 Claims, 15 Drawing Sheets

(56) References Cited

U.S. PATENT DOCUMENTS

| | | | |
|---|---|---|---|
| 2017/0075341 A1* | 3/2017 | Nagashima | G05B 19/4147 |
| 2019/0004500 A1* | 1/2019 | Saitou | G05B 19/4155 |
| 2021/0011731 A1* | 1/2021 | Onose | G06F 9/3856 |
| 2021/0103265 A1* | 4/2021 | Fujimura | G06F 8/34 |
| 2021/0311459 A1* | 10/2021 | Nakayama | G05B 23/0264 |
| 2022/0137586 A1* | 5/2022 | Cousineau | G05B 19/0426 |
| | | | 700/86 |
| 2022/0198113 A1* | 6/2022 | Tomonaga | G06F 30/343 |

FOREIGN PATENT DOCUMENTS

| | | |
|---|---|---|
| JP | 2015-149004 A | 8/2015 |
| JP | 2015-170009 A | 9/2015 |
| JP | 2018-133034 A | 8/2018 |

* cited by examiner

FIG. 4

| PATH No. | COMBINATION OF CONTACT POINTS |
|---|---|
| 1 | R1111.0&&F0089.5 |
| 2 | DDDD |
| 3 | X0010.6&&EEEE |

FIG. 5

| PATH No. | COMBINATION OF CONTACT POINTS | OPERATION RESULT |
|---|---|---|
| 1 | R1111.0&&F0089.5 | FALSE |
| 2 | DDDD | TRUE |
| 3 | X0010.6&&EEEE | TRUE |

FIG. 7

| PATH No. | COMBINATION OF CONTACT POINTS | FIRST OPERATION RESULT |
|---|---|---|
| 1 | R1111.0&&F0089.5 | FALSE |
| 2 | DDDD | TRUE |
| 3 | X0010.6&&EEEE | TRUE |

FIG. 8

| PATH No. | COMBINATION OF CONTACT POINTS | SECOND OPERATION RESULT |
|---|---|---|
| 1 | R1111.0&&F0089.5 | FALSE |
| 2 | DDDD | FALSE |
| 3 | X0010.6&&EEEE | TRUE |

FIG. 9

| PATH No. | FIRST OPERATION RESULT | SECOND OPERATION RESULT |
|---|---|---|
| 1 | FALSE | FALSE |
| 2 | TRUE | FALSE |
| 3 | TRUE | TRUE |

FIG. 13

| PATH No. | COMBINATION OF CONTACT POINTS | OPERATION RESULT |
|---|---|---|
| 1 | R1111.0&&F0089.5 | FALSE |
| 2 | DDDD | TRUE |
| 3 | X0010.6&&EEEE | TRUE |
| 1 | R1111.0&&F0089.5 | TRUE |
| 1 | R1111.0&&F0089.5 | FALSE |
| 1 | R1111.0&&F0089.5 | TRUE |

FIG. 17

| PATH No. | VALUE |
|---|---|
| 1 | OFF |
| 2 | ON |
| 3 | OFF | ced # LADDER PROGRAM ANALYSIS DEVICE USED IN A PROGRAMMABLE LOGIC CONTROLLER (PLC)

TECHNICAL FIELD

The present invention relates to a ladder program analysis device.

BACKGROUND ART

In software development, it is required to record coverage in order to prove test execution in reliability improvement and functional safety certification.

The term "coverage", also called code coverage, is one of the measures used in software testing, and means the percentage of the degree to which the source code of a program is tested.

For the purpose of improving coverage, there is known a technique in which a PLC program that operates a programmable logic controller (PLC) is converted into a general-purpose language program written in a general-purpose programming language, and the general-purpose language program is tested (for example, Patent Document 1).

Patent Document 1: Japanese Unexamined Patent Application, Publication No. 2016-133034

DISCLOSURE OF THE INVENTION

Problems to be Solved by the Invention

In a ladder language used in PLC, an input circuit for one coil output branches or merges, and in order to record which route among a plurality of routes has been verified, it is necessary to manage it in a separate file. Thus, it is difficult to record the coverage.

In addition, when the condition for turning on the coil is satisfied only for one scan, for example, the coverage cannot be confirmed visually, and it is necessary to record the coverage while taking a log using another function such as tracing.

In order to record coverage easily, there is a requirement for a technique that can measure an execution path of a ladder program without a manual operation of an operator.

Means for Solving the Problems

One aspect of the present disclosure provides an analysis device including: a path analysis unit that analyzes paths of a ladder program circuit; a contact point combination acquisition unit that acquires combinations of contact points of the analyzed paths; and a path output unit that outputs a path based on an operation result of condition values for each of the combinations.

Effects of the Invention

According to one aspect, an execution path of a ladder program can be measured without a manual operation of an operator.

BRIEF DESCRIPTION OF THE DRAWINGS

FIG. 4 is a table showing examples of combinations of contact points in each path included in the range shown in FIG. 3;

FIG. 5 is a table showing an example of the result of a logical operation for each path shown in FIG. 4;

FIG. 7 is a table showing an example of the result of a first logical operation for each path shown in FIG. 3;

FIG. 8 is a table showing an example of the result of a second logical operation for each path shown in FIG. 3;

FIG. 9 is a table showing the difference between the result of the first logical operation shown in FIG. 7 and the result of the second logical operation shown in FIG. 8;

FIG. 13 is a table showing execution history of operations according to one aspect;

FIG. 17 is a table showing an example of output results for each path shown in FIG. 16.

PREFERRED MODE FOR CARRYING OUT THE INVENTION

1. First Embodiment

A first embodiment of the present invention will be described below with reference to FIGS. 1 to 10.

Figure 1:
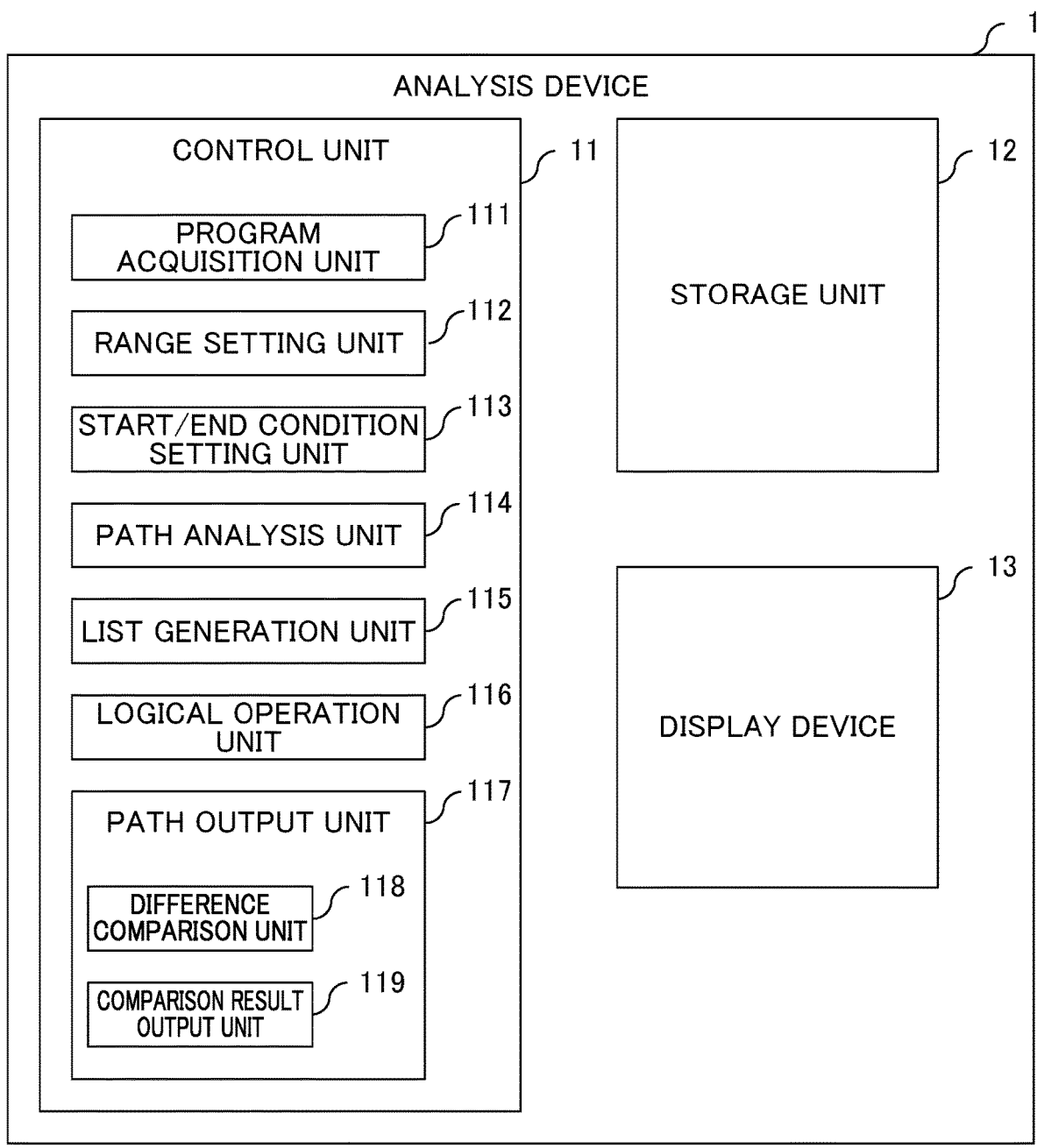
FIG. 1 is a functional block diagram illustrating functions of an analysis device according to one aspect.

FIG. 1 is a functional block diagram illustrating functions of an analysis device 1 according to the present embodiment.

Figure 2:
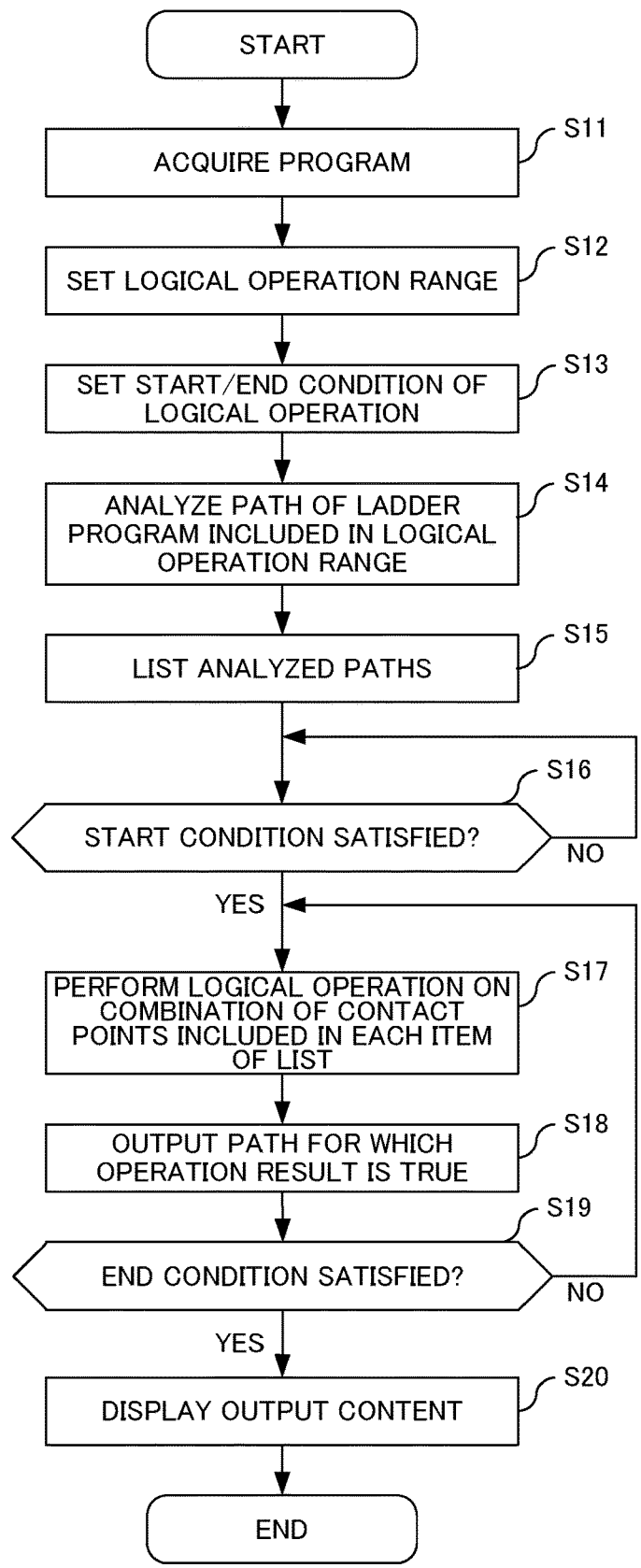
FIG. 2 is a flowchart showing the operation of an analysis device according to one aspect.

FIG. 2 is a flowchart showing the operation of the analysis device 1.

Figure 3:
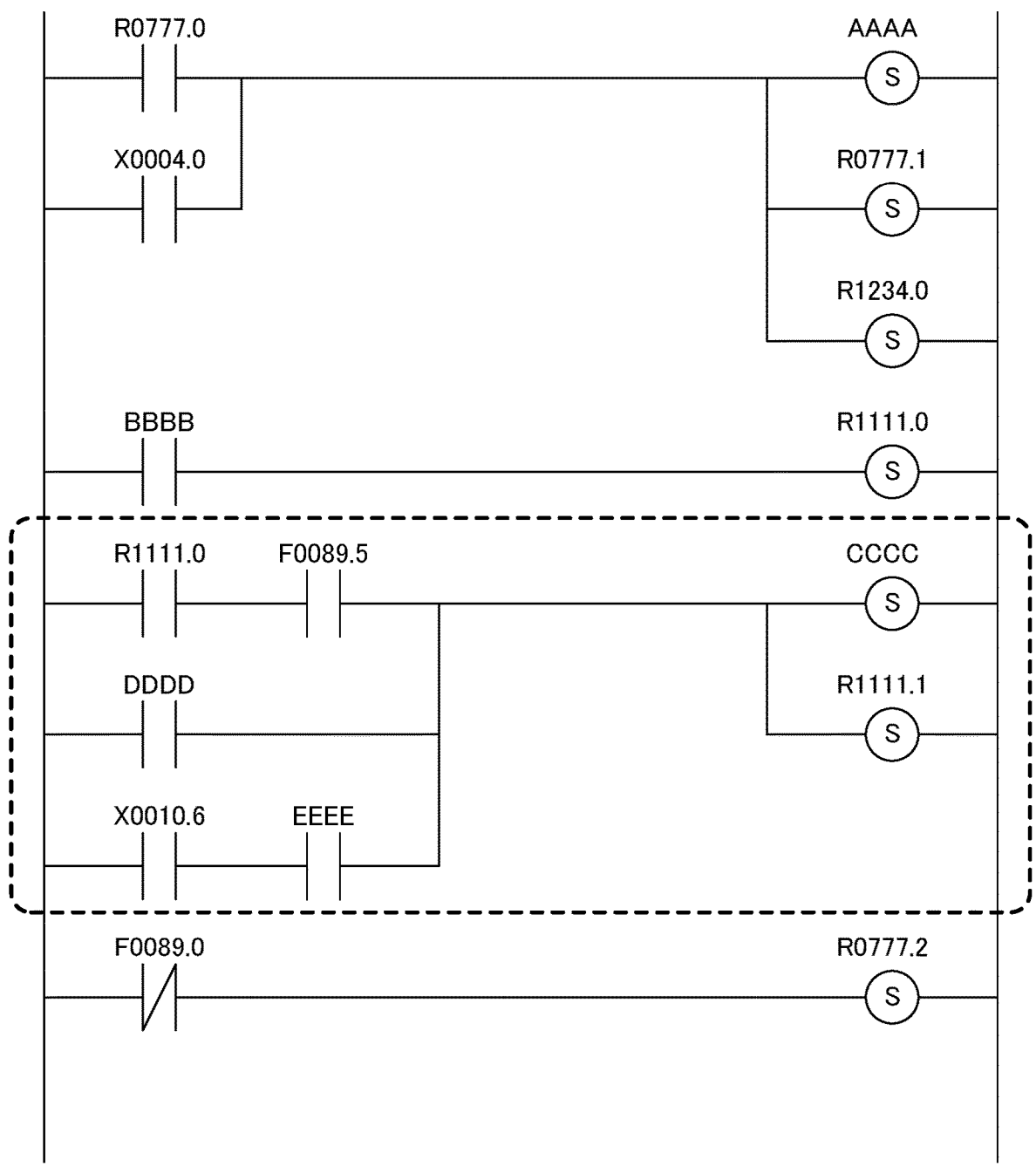
FIG. 3 is a diagram showing an example of a logical operation range in a ladder program to be analyzed by an analysis device according to one aspect.

FIG. 3 is a diagram showing an example of a logical operation range in a ladder program to be analyzed by the analysis device 1.

FIG. 4 is a table showing an example of a combination of contact points in each path included in the logical operation range shown in FIG. 3.

FIG. 5 is a table showing an example of the result of a logical operation for each path shown in FIG. 4.

Figure 6:
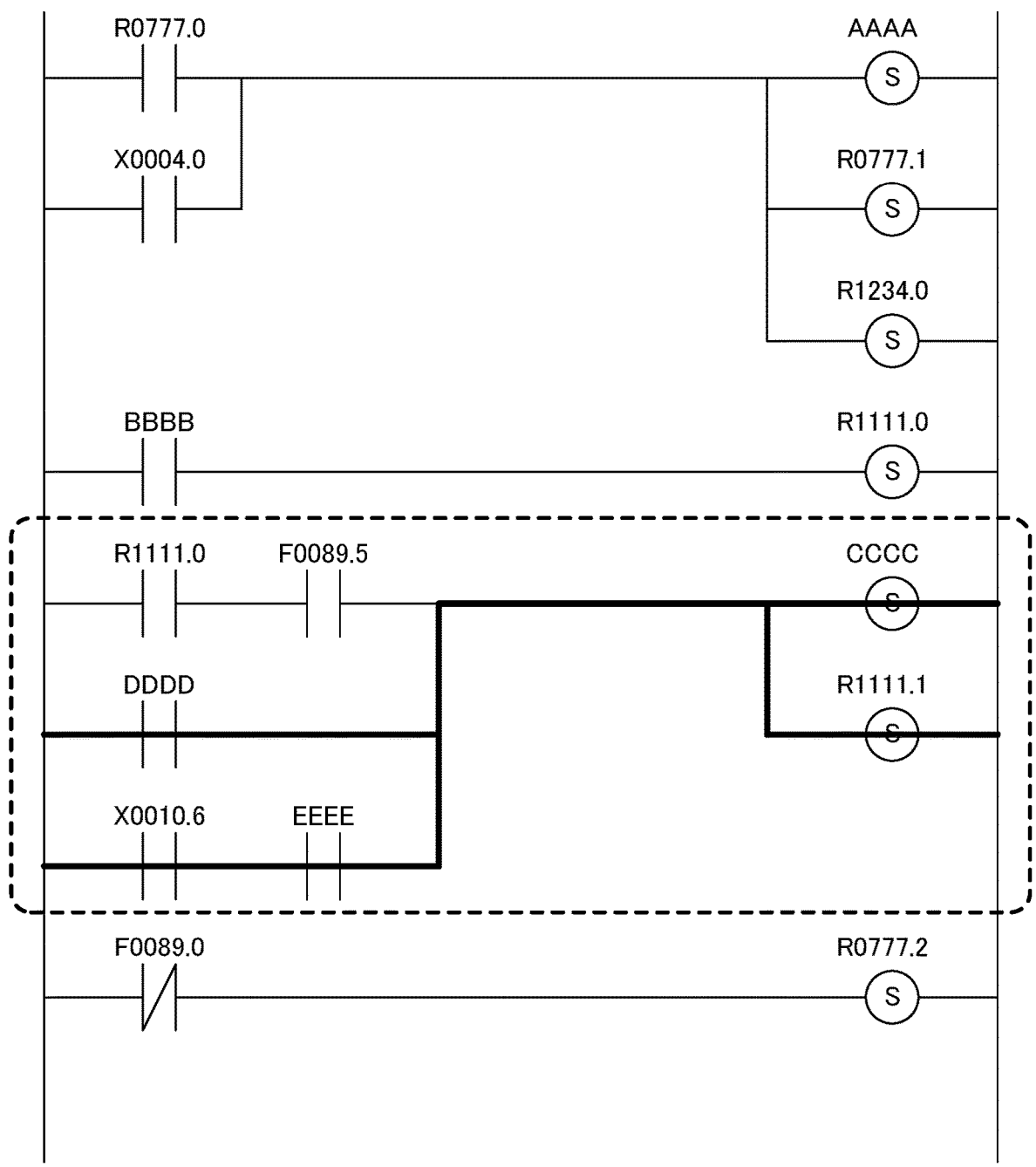
FIG. 6 is an example of a diagram showing the result of the logical operation shown in FIG. 5 in a ladder program.

FIG. 6 is an example of a diagram showing the result of the logical operation shown in FIG. 5 in a ladder program.

FIG. 7 is a table showing an example of the result of a first logical operation for each path shown in FIG. 3.

FIG. 8 is a table showing an example of the result of a second logical operation for each path shown in FIG. 3.

FIG. 9 is a table showing the difference between the result of the first logical operation shown in FIG. 7 and the result of the second logical operation shown in FIG. 8.

Figure 10:
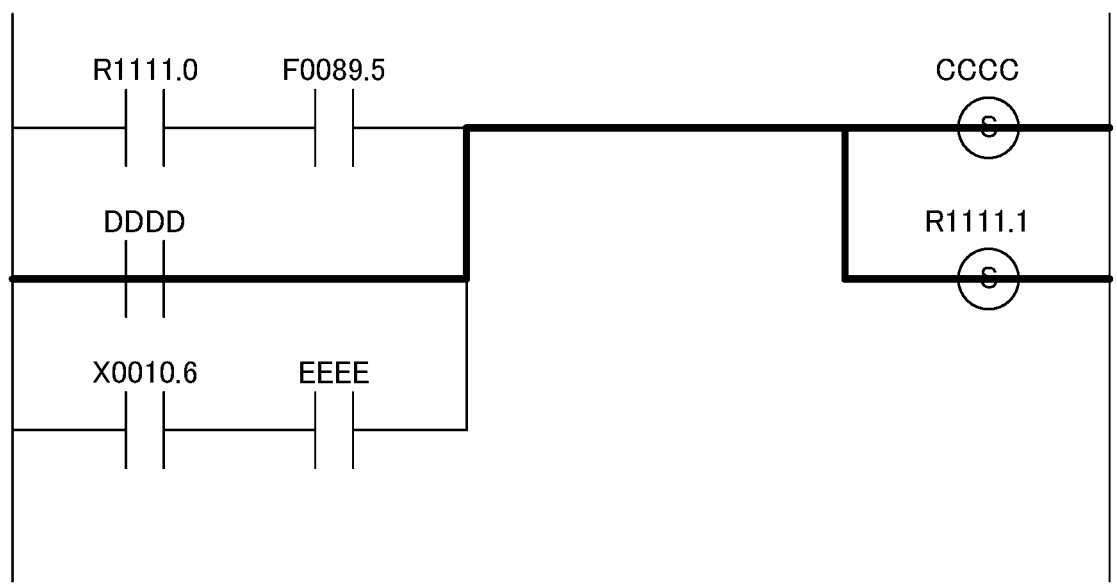
FIG. 10 is an example of a diagram showing the difference shown in FIG. 9 in a ladder program.

FIG. 10 is an example of a diagram showing the difference shown in FIG. 9 in a ladder program.

1.1. Configuration of the First Embodiment

As shown in FIG. 1, the analysis device 1 according to the present embodiment includes a control unit 11, a storage unit 12 and a display device 13.

The control unit 11 is a part that controls the entire analysis device 1, and realizes various functions of the present embodiment by reading and executing various programs from a storage area such as a RPM, a RAM, a flash memory, or a hard disk drive (HDD) as appropriate.

The control unit 11 may be a CPU.

The control unit 11 includes a program acquisition unit 111, a range setting unit 112, a start/end condition setting unit 113, a path analysis unit 114, a list generation unit 115, a logical operation unit 116 and a path output unit 117. The control unit 11 executes and analyzes a ladder program.

The program acquisition unit 111 acquires a ladder program to be analyzed by the analysis device 1 from the storage unit 12 which will be described later.

The range setting unit 112 sets the range of paths to be subjected to a logical operation by the logical operation unit 116, which will be described later.

The range setting unit 112 makes it possible to per logical operations not on all the circuits constituting the ladder program, but on only some of the circuits.

The start/end condition setting unit 113 sets start conditions and end conditions for logical operations.

The start/end condition setting unit 113 may use, for example, an event that "X0.0" in the ladder program is turned ON, or an event that a start button for instructing the start of analysis of the ladder program in the analysis device 1 is pressed, as a start condition.

In addition, the start/end condition setting unit 113 may use, for example, an event that "X0.0" in the ladder program is turned OFF, or an event that an end button for instructing the end of analysis of the ladder program in the analysis device 1 is pressed, as an end condition.

The path analysis unit 114 analyzes each path of the ladder program circuit.

More specifically, the path analysis unit 114 identifies (reveals) all paths included in the ladder program circuit.

The list generation unit 115 lists the paths analyzed by the path analysis unit 114.

The logical operation unit 116 performs a logical operation using the condition value of each combination of contact points included in each item of the list generated by the list generation unit 115.

Hereinafter, the list generation unit 115 and the logical operation unit 116 may be collectively referred to as a "contact point combination acquisition unit".

The path output unit 117 outputs a path based on the operation result from the logical operation unit 116.

For example, the path output unit 117 may output only paths for which the operation result from the logical operation unit 116 is true.

Alternatively, the path output unit 117 may output only paths for which the operation result from the logical operation unit 116 is false.

Further, the output destination of these operation results may be the storage unit 12 described later or may be the display device 13.

The path output unit 117 includes a difference comparison unit 118 and a comparison result output unit 119. When the logical operation unit 116 performs the logical operation on a predetermined path a plurality of times, the difference comparison unit 118 compares the results of the plurality of logical operations.

The comparison result output unit 119 outputs the comparison result from the difference comparison unit 118 together with the path corresponding to each operation result included in the comparison result.

The storage unit 12 is a storage device that stores the ladder program acquired by the program acquisition unit 111, the path output by the path output unit 117, the comparison result output by the comparison result output unit 119 included in the path output unit 117, and the like.

The display device 13 is a display device that displays the ladder program acquired by the program acquisition unit 111, the path output by the path output unit 117, the comparison result output by the comparison result output unit 119 included in the path output unit 117, and the like, and is realized by, for example, a liquid crystal monitor.

1.2. Operation of the First Embodiment

The operation of the analysis device 1 according to the present embodiment will be described below with reference to the flowchart of FIG. 2 and the diagrams illustrated in FIGS. 3 to 10.

In Step S11, the program acquisition unit 111 acquires the ladder program from the storage unit 12.

In Step S12, the range setting unit 112 sets a logical operation range.

FIG. 3 shows an example of setting a logical operation range.

In the example of FIG. 3, a range is set that includes a path including "R1111.0" and "F0089.5", a path including "DDDD", and a path including "X0010.6" and "EEE E".

In Step S13, the start/end condition setting unit 113 sets the start condition and the end condition of the logical operation.

In Step S14, the path analysis unit 114 analyzes the path of the ladder program included in the logical operation range.

In Step S15, the list generation unit 115 lists the analyzed paths.

FIG. 4 is an example of a list generated by the list generation unit 115.

If the start condition is satisfied in Step S16 (S16: YES), the process proceeds to Step S17.

If the start condition is not satisfied (S16: NO), the process returns to step S16.

In Step S17, the logical operation unit 116 performs a logical operation on condition values corresponding to combinations of contact points included in each item of the list.

FIG. 5 shows an example of the result of a logical operation.

In Step S18, the path output unit 117 outputs paths for which the operation result is true.

Here, as an example, the path output unit 117 outputs a path for which the operation result is true to the display device 13, but the present invention is not limited to this. The path output unit 117 may output a path for which the operation result is false instead of a path for which the operation result is true.

Note that the output destination may be the storage unit 12 instead of the display device 13.

In Step S19, if the end condition is satisfied (S19: YES), the process proceeds to Step S20.

If the end condition is not satisfied (S19: NO), the process returns to Step S17.

In Step S20, the display device 13 displays the output content output by the path output unit 117.

FIG. 6 shows an example of the display, in which the path of No. 2 for which the operation result is true in FIG. 5 is highlighted (the path is shown in bold in FIG. 6).

Note that the analysis device 1 may not only output the path for which the operation result is true, but may also output the comparison result from the difference comparison unit 118 together with the path corresponding to each operation result included in the comparison result.

Hereinafter, by referring to FIGS. 7 to 9, an example of outputting the operation result included in the comparison result together with the path corresponding to the comparison result will be described.

FIG. 7 is a table showing an example of a first operation result.

In the table of FIG. 7, the operation result of the path No. 1 is "FALSE", the operation result of the path No. 2 is "TRUE", and the operation result of the path No. 3 is "FALSE".

FIG. 6 is a table showing an example of a second operation result.

In the table of FIG. 8, the operation result of the path No. 1 is "FALSE", the operation result of the path No. 2 is "FALSE", and the operation result of the path No. 3 is "FALSE".

When compared with the table of FIG. 7, the operation result of the path No. 2 has changed from "TRUE" to "FALSE".

FIG. 9 is a table showing a comparison result between the first operation result and the second operation result. As mentioned above, the operation result of the path No. 2 is "TRUE" in the first operation result and is "FALSE" in the second operation result.

In FIG. 9, the column of the path No, 2 with different operation results is surrounded by a bold line.

FIG. 10 shows an example of a ladder program displayed by the display device 13 when the comparison result output unit 119 outputs the comparison results to the display device 13.

In the example shown in FIG. 10, the path of No, 2 is highlighted (the path is shown in bold in FIG. 10).

The display device 13 may display the table of FIG. 0 instead of the ladder program shown in FIG. 10.

2. Second Embodiment

A second embodiment of the present invention will be described below with reference to FIGS. 11 to 13.

Figure 11:
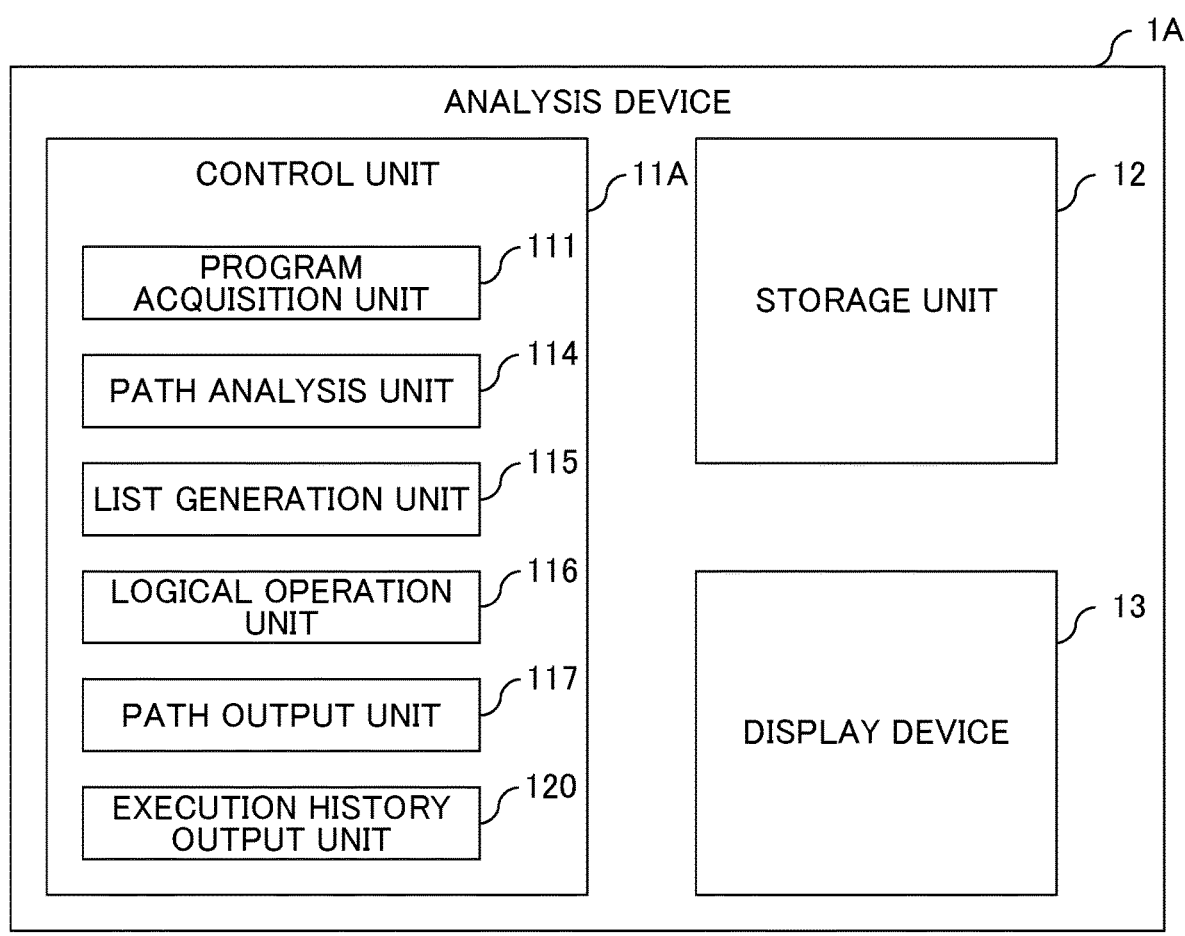
FIG. 11 is a functional block diagram illustrating functions of an analysis device according to one aspect.

FIG. 11 is a functional block diagram illustrating functions of an analysis device 1A according to the present embodiment.

Figure 12:
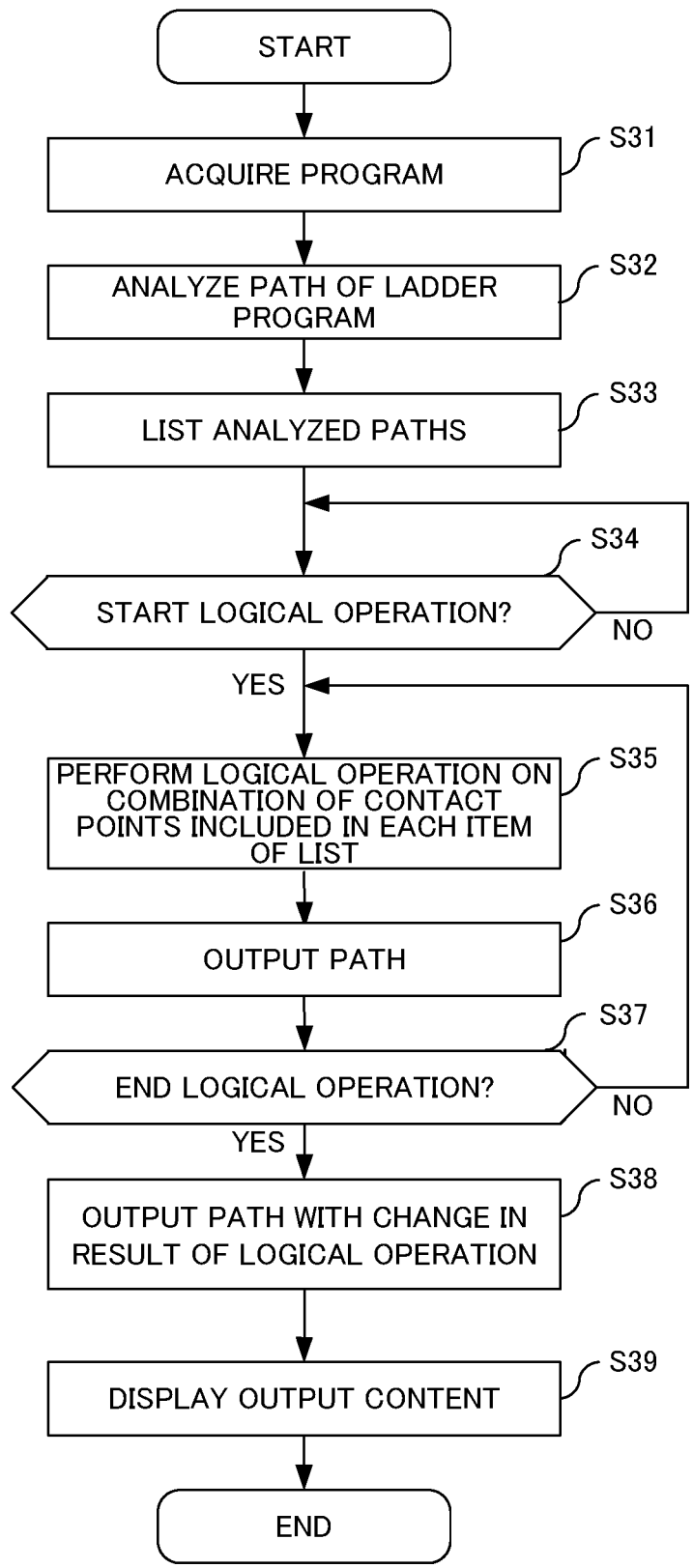
FIG. 12 is a flowchart showing the operation of an analysis device according to one aspect.

FIG. 12 is a flowchart showing the operation of the analysis device 1A.

FIG. 13 is a table showing execution history of operations.

In the following, for the sake of simplification of explanation, the components and operations of the analysis device 1A according to the second embodiment different from those of the analysis device 1 according to the first embodiment will mainly be described, and the description of the same components and operations may be omitted.

2.1. Configuration of Second Embodiment

Referring to FIG. 11, a control unit 11A provided in the analysis device 1A differs from the control unit 11 provided in the analysis device 1 in that it further includes an execution history output unit 120.

Note that FIG. 11 does not show the range setting unit 112, the start/end condition setting unit 113, the difference comparison unit 118, and the comparison result output unit 119 included in the control unit 11 of the analysis device 1 for the sake of simplicity of explanation. However, one or more of these components may be provided.

The execution history output unit 120 outputs a path with a change in the result of the logical operation together with the execution history of each path when the logical operation is executed a plurality of times.

The output destination may be the storage unit 12 or the display device 13.

2.2. Operation of Second Embodiment

The operation of the analysis device 1A according to the present embodiment will be described below with reference to the flowchart of FIG. 12 and the table illustrated in FIG. 13.

In Step S31, the program acquisition unit 111 acquires the ladder program from the storage unit 12.

In Step S32, the path analysis unit 114 analyzes paths of the ladder program.

In Step S33, the list generation unit 115 lists the analyzed each path.

In Step S34, if the logical operation is to be started (S34: YES), the process proceeds to Step S35.

If the logical operation is not to be started (S34: NO), the process returns to Step S34.

In Step S35, the logical operation unit 116 performs a logical operation on condition values corresponding to combinations of contact points included in each item of the list.

In Step S36, the path output unit 117 outputs the path together with the operation result.

Here, it is assumed that the path output unit 117 outputs the path together with the operation result to the execution history output unit 120.

In Step S37, if the logical operation is to be ended (537: YES), the process proceeds to Step S38.

If the logical operation is not to be ended (S37: NO), the process returns to Step S35.

In Step S38, the execution history output unit 120 outputs the path with a change in the result of the logical operation together with the execution history of each path. Here, the execution history output unit 120 outputs the execution history to the display device 13, but the present invention is not limited to this, and the output destination may be the storage unit 12.

In Step S39, the display device 13 displays the content output from the execution history output unit 120. FIG. 13 is an example of the display.

For the path of No. 1, the operation result in the first logical operation is "TRUE", the operation result in the second logical operation is "FALSE", and the operation result in the third logical operation is "FALSE".

That is, since the operation result for the path of No. 1 changes, the path is highlighted (the column thereof is surrounded by a bold line in FIG. 13).

3. Third Embodiment

A third embodiment of the present invention will be described below with reference to FIGS. 14 to 18.

Figure 14:
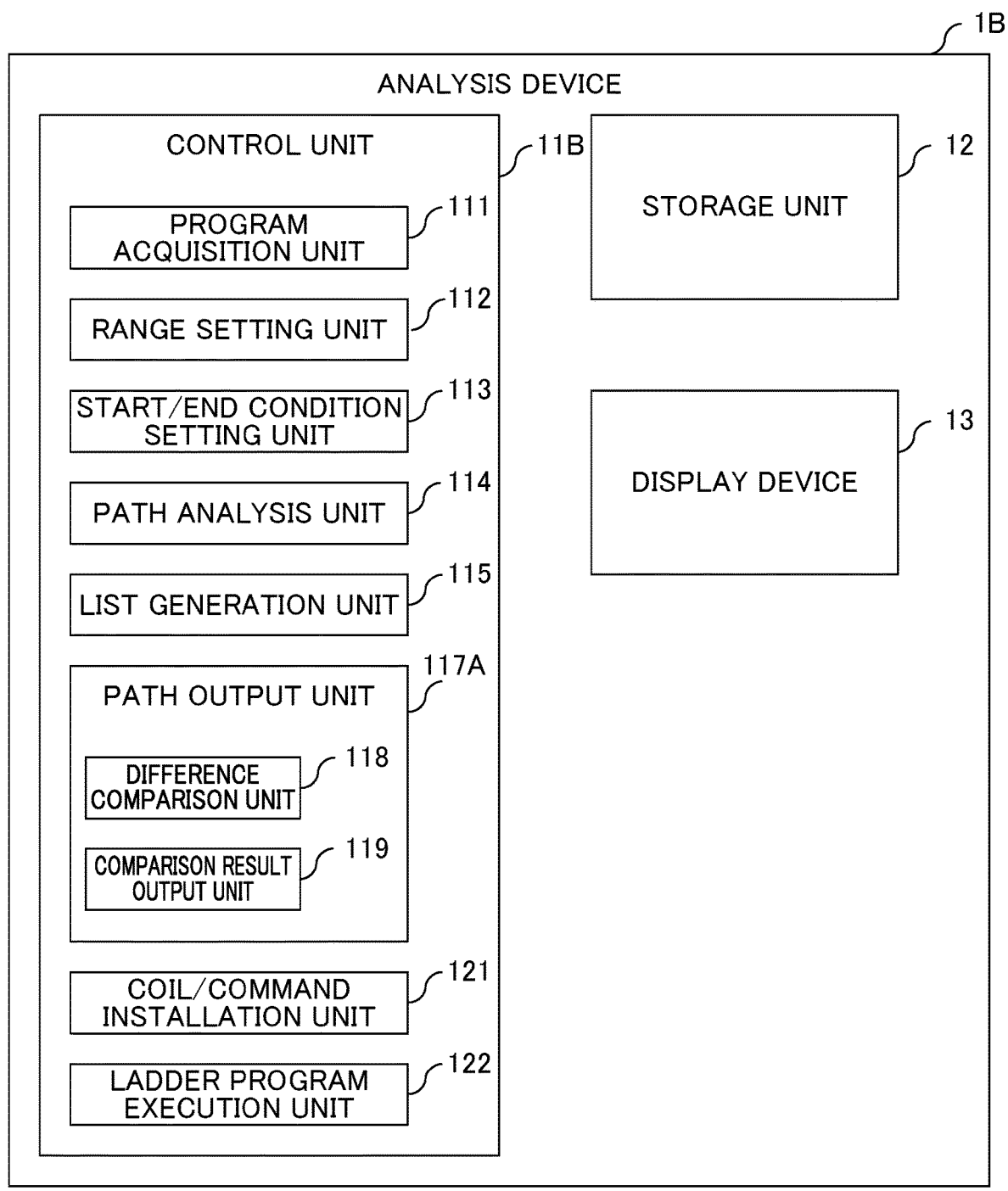
FIG. 14 is a functional block diagram illustrating functions of an analysis device according to one aspect.

FIG. 14 is a functional block diagram illustrating functions of an analysis device 1B according to the present embodiment.

Figure 15:
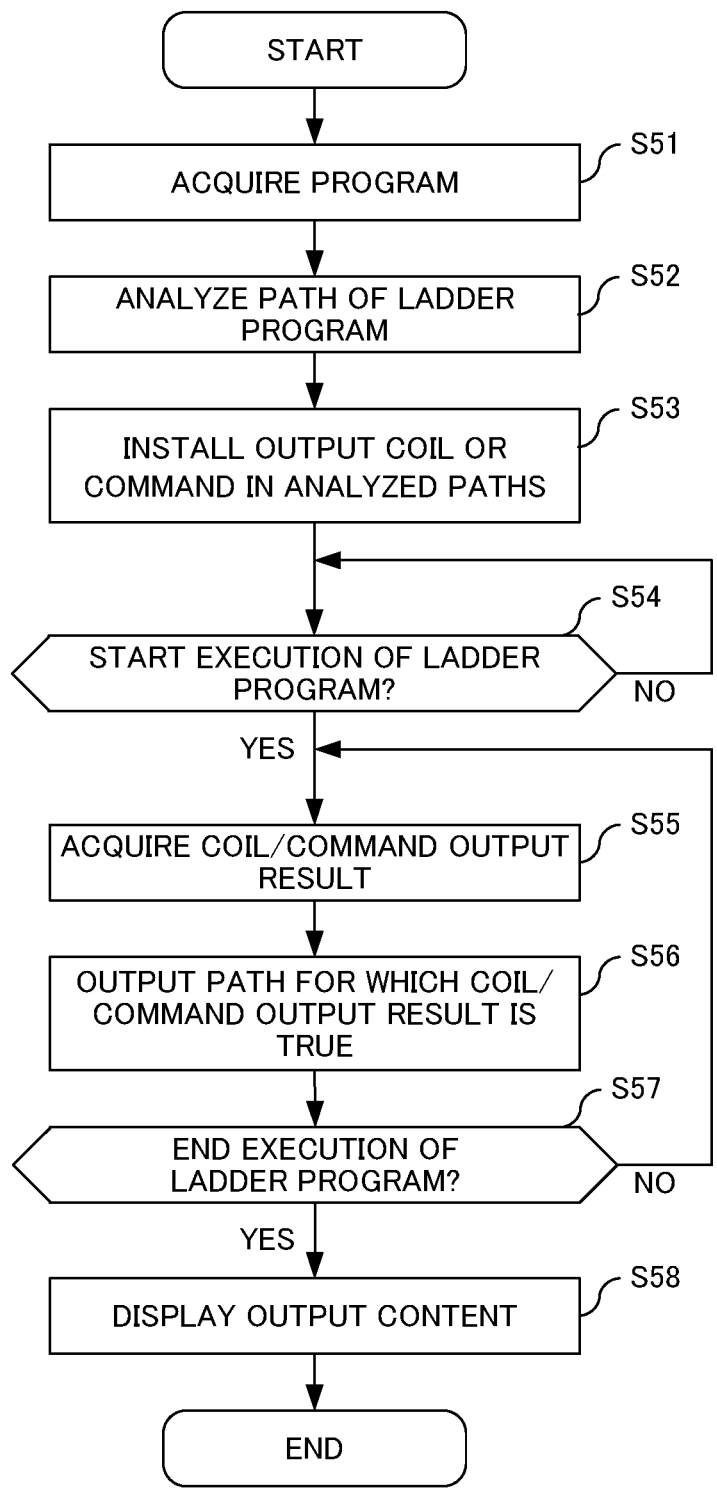
FIG. 15 is a flowchart showing the operation of an analysis device according to one aspect.

FIG. 15 is a flowchart showing the operation of the analysis device 1B.

Figure 16:
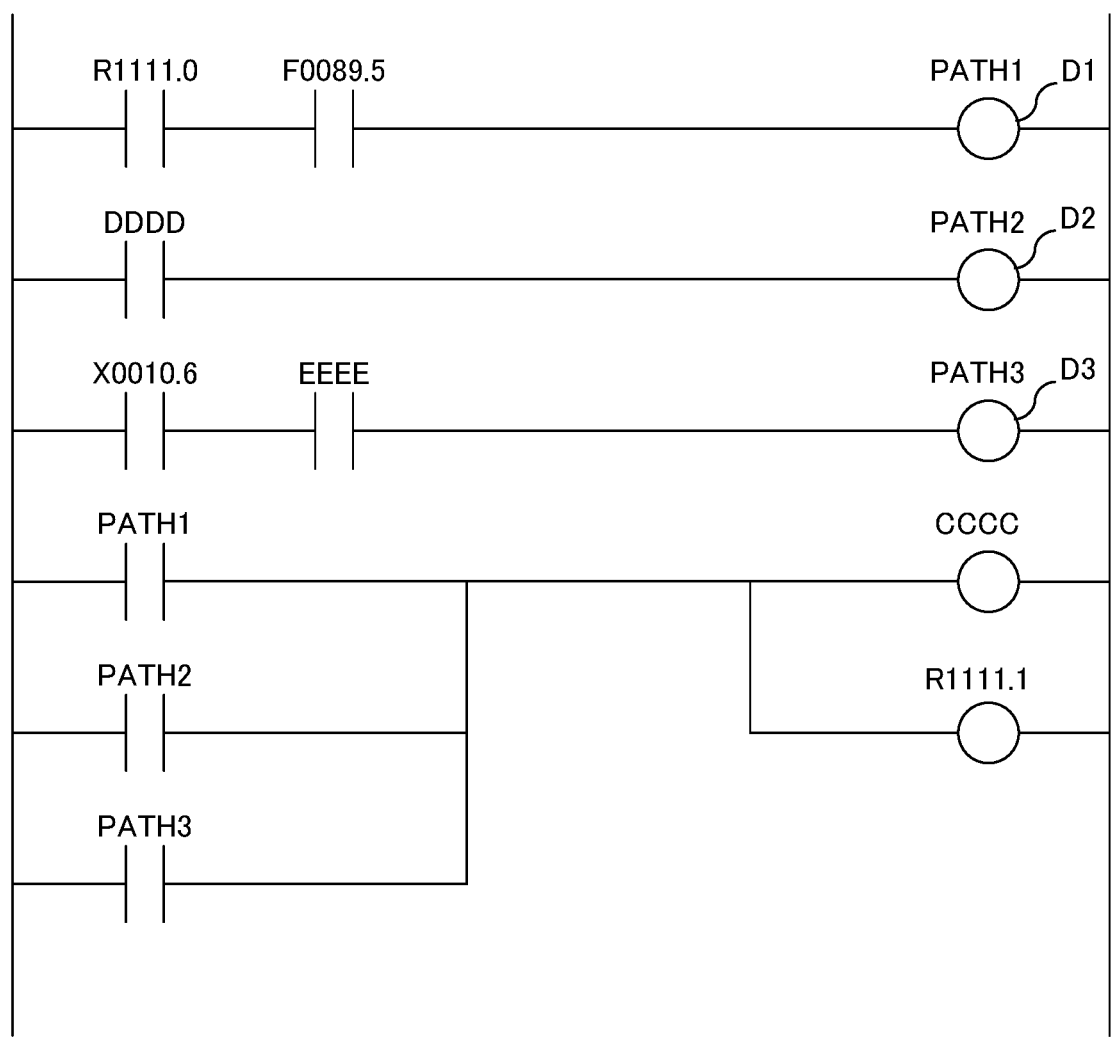
FIG. 16 shows an example in which a dummy output coil is installed in each path that constitutes a ladder program.

FIG. 16 shows an example in which a dummy output coil is installed in each path constituting a ladder program.

Figure 17:
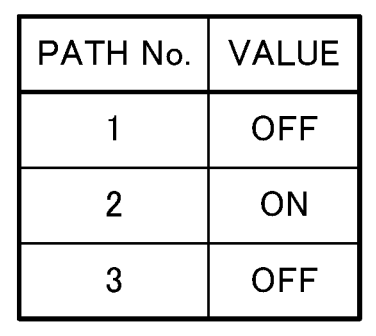

FIG. 17 is a table showing an example of output results for each path shown in FIG. 3.

Figure 18:
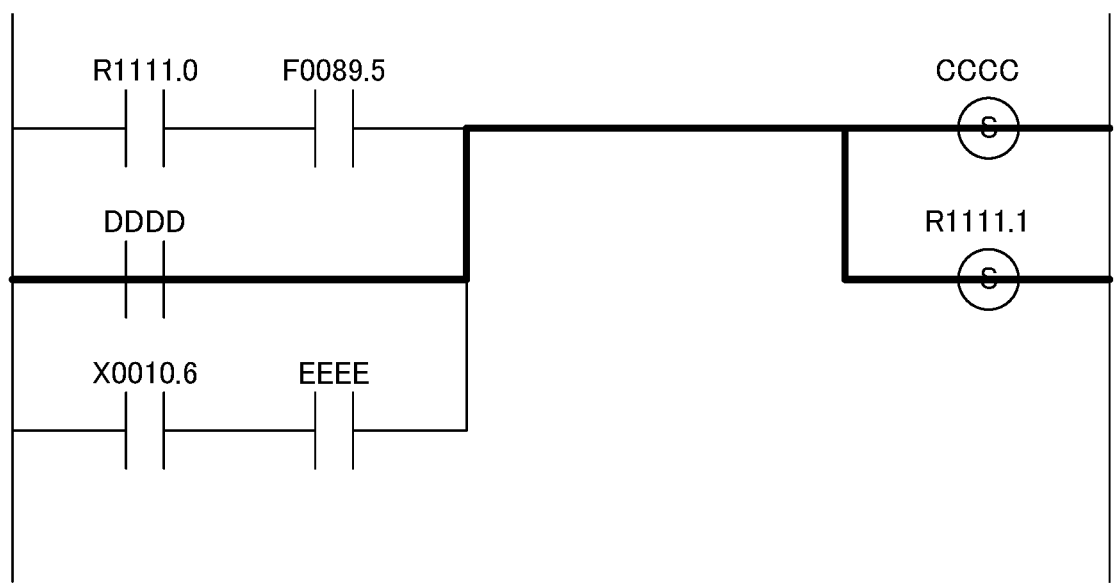
FIG. 18 is an example of a diagram showing the output results shown in FIG. 17 in a ladder program.

FIG. 18 is an example of a diagram showing the output result shown in FIG. 17 in a ladder program.

In the following, for the sake of simplification of explanation, the components and operations of the analysis device 1B according to the third embodiment different from those of the analysis device 1 according to the first embodiment will mainly be described, and the description of the same components and operations may be omitted.

3.1. Configuration of Third Embodiment

Referring to FIG. 14, a control unit 11B included in the analysis device 1B does not include the logical operation unit 116, and instead includes a coil/instruction installation unit 121, unlike the control unit 11 included in the analysis device 1.

The coil/instruction installation unit 121 installs (lays out) a dummy output coil or instruction in each path analyzed by the path analysis unit 114.

It should be noted that the coil/instruction installation unit 121 in the present embodiment constitutes a part or an entire part of the "contact point combination acquisition unit".

A path output unit 117A outputs paths based on output results from the dummy output coils or instructions installed by the coil/instruction installation unit 121.

The start/end condition setting unit 113 sets the start condition and the end condition for the output of the output coils or instructions.

A ladder program execution unit 122 that executes the ladder program executes the output coils or instructions installed by the coil/instruction installation unit 121.

Specifically, the ladder program execution unit 122 starts the output of the output coil or instruction when the start condition is satisfied, and ends the output of the output coil or instruction when the end condition is satisfied.

The ladder program execution unit 122 is also provided as a functional configuration in the control unit 11 of the first embodiment and the control unit 11A of the second embodiment.

The range setting unit 112 sets the range of paths to which the output coil or instruction is output.

The path analysis unit 114 analyzes paths within the set range.

Similar to the execution history output unit 120 in the second embodiment, the third embodiment may further include an execution history output unit (not shown) that outputs a path with a change in the result of the output of the output coil or instruction together with an execution history for each path when the output of the output coil or instruction is executed a plurality of times.

3.2. Operation of Third Embodiment

The operation of the analysis device 1B according to the present embodiment will be described below with reference to the flowchart of FIG. 15 and the diagrams of FIGS. 16 to 18.

In Step S51, the program acquisition unit 111 acquires the ladder program from the storage unit 12.

In Step 352, the path analysis unit 114 analyzes paths of the ladder program.

In Step S53, the coil/instruction installation unit 121 installs dummy output coils or instructions in the analyzed paths.

FIG. 16 shows an installation, example of output coils D1 to D3.

In Step S54, when the ladder program execution unit 122 starts executing the ladder program (S54: YES), the process proceeds to Step S55.

If the ladder program execution unit 122 does not yet start executing the ladder program (S54: NO), the process returns to Step S54.

In Step S55, a path output unit 117A acquires output results from the output coils or instructions.

FIG. 17 is a table showing an example of output results.

In Step S56, the path output unit 117A outputs a path for which the output result from the output coil or instruction is true.

In this Step S56, the path output unit 117A may output a path for which the output result is false instead of the path for which the output result is true.

Note that the path output unit 117A outputs a path to the display device 13, but the present invention is not limited to this, and the output destination may be the storage unit 12.

In Step S57, when the ladder program execution unit 122 ends execution of the ladder program (S57: YES), the process proceeds to Step S58.

If the ladder program execution unit 122 does not yet end execution of the ladder program (S57: NO), the process returns to Step S55.

In Step S58, the display device 13 displays the contents output from the path output unit 117A.

FIG. 18 shows an example of the display, and the path of No. 2 for which the output result is ON in FIG. 17 is highlighted (the path is shown in bold in FIG. 18).

4. Effects

The analysis device according to the present invention includes the path analysis unit 114 that analyzes paths of a ladder program circuit, the contact point combination acquisition unit that acquires a combination of contact points of the analyzed paths, and the path output unit 117 that outputs a path based on an operation result of condition values for each combination.

As a result, the execution path of the ladder program can be measured without a manual operation of an operator.

Further, the analysis device according to the present invention is provided with the execution history output unit 120 that outputs a path with a change in the result of the logical operation together with the execution history of each path when the logical operation is executed a plurality of times. Thus, it is possible to confirm the execution history of the ladder program without using functions such as tracing.

EXPLANATION OF REFERENCE NUMERALS 1, 1A, 1B Analysis device
11, 11A, 11B Control unit
12 Storage unit
13 Display device
111 Program acquisition unit
112 Range setting unit
113 Start/end condition setting unit 114 Path analysis unit
115 List generation unit
116 Logical operation unit
117, 117A Path output unit
118 Difference comparison unit
119 Comparison result output unit
120 Execution history output unit
121 Coil/instruction installation unit
122 Ladder program execution unit

The invention claimed is:

1. An analysis device for a ladder program comprising:
a processor coupled to a storage unit, having control instructions stored thereon, which, when executed by the processor, causes the analysis device to perform a control process comprising:
analyzing paths of a ladder program circuit;
listing each of the analyzed paths of the ladder program circuit to acquire combinations of contact points in each of the analyzed paths of the ladder program circuit;
outputting a predetermined path based on one or more operation results of condition values for each acquired combination of contact points of the analyzed paths of the ladder program circuit included in each item of a list generated by the listing;
setting a start condition and an end condition for an output of an output coil or an instruction; and
executing a ladder program, wherein executing the ladder program includes starting the output of the output coil or the instruction when the start condition is satisfied, and terminating the output of the output coil or the instruction when the end condition is satisfied.

2. The analysis device according to claim 1, wherein the one or more operation results of condition values are based on performing a logical operation on the condition values for each acquired combination of contact points of the analyzed paths of the ladder program circuit as the control process.

3. The analysis device according to claim 1, wherein the one or more operation results of condition values are based on installing the output coil or the instruction on each path for each acquired combination of contact points of the analyzed paths of the ladder program circuit as the control process.

4. The analysis device according to claim 2, as the control process, performing the logical operation further comprising:
setting a start condition and an end condition for the logical operation as the control process; and
starting the logical operation when the start condition is satisfied, and terminating the logical operation when the end condition is satisfied.

5. The analysis device according to claim 2, as the control process, performing the logical operation further comprising:
setting a range of paths to be subjected to the logical operation; and
analyzing the paths of the ladder program circuit within the set range of paths.

6. The analysis device according to claim 2, as the control process, outputting the predetermined path further comprising:
comparing a plurality of operation results when the logical operation is executed a plurality of times; and
outputting a comparison result from the comparing.

7. The analysis device according to claim 2, as the control process, further comprising:
outputting a path with a change in a result of the logical operation together with an execution history for each path when the logical operation is executed a plurality of times.

8. The analysis device according to claim 3, as the control process, further comprising:
setting a range of paths to which the output coil or the instruction is output, wherein analyzing the paths of the ladder program circuit includes analyzing paths within the set range of paths.

9. The analysis device according to claim 3, as the control process, outputting the predetermined path further comprising:
comparing output results of the output coil or the instruction when the output of the output coil or the instruction is executed a plurality of times; and
outputting a comparison result from the comparing.

10. The analysis device according to claim 7, as the control process, further comprising:
outputting a path with a change in a result of the output of the output coil or the instruction together with an execution history for each path when the output of the output coil or the instruction is executed a plurality of times.

11. The analysis device according to claim 1, as the control process, further comprising:
a display device, wherein the control process further includes executing control for causing the display device to display output results according to outputting the predetermined path.

* * * * *